(12) United States Patent
Hicks et al.

(10) Patent No.: US 9,864,801 B2
(45) Date of Patent: Jan. 9, 2018

(54) RESPONSIVE LAYOUT BASED ON BEHAVIORAL INTENT IN A MULTI-TENANT PLATFORM-AS-A-SERVICE (PAAS) SYSTEM

(71) Applicant: Red Hat, Inc., Raleigh, NC (US)

(72) Inventors: Matthew Hicks, Westford, MA (US); Michael P. McGrath, Schaumburg, IL (US); Clayton Coleman, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1139 days.

(21) Appl. No.: 13/751,322

(22) Filed: Jan. 28, 2013

(65) Prior Publication Data

US 2014/0215312 A1    Jul. 31, 2014

(51) Int. Cl.
G06F 17/00    (2006.01)
G06F 17/30    (2006.01)

(52) U.S. Cl.
CPC ............ G06F 17/30861 (2013.01)

(58) Field of Classification Search
CPC ............................... G06F 17/30861
See application file for complete search history.

(56) References Cited

U.S. PATENT DOCUMENTS

| 2003/0058277 | A1* | 3/2003 | Bowman-Amuah | G06F 17/30607 715/765 |
| 2004/0009813 | A1* | 1/2004 | Wind | A63F 13/10 463/30 |
| 2011/0119088 | A1* | 5/2011 | Gunn | G06F 19/322 705/3 |
| 2011/0251992 | A1* | 10/2011 | Bethlehem | H04L 12/2863 707/610 |
| 2012/0035943 | A1* | 2/2012 | Araghi | G06Q 30/06 705/1.1 |
| 2012/0054626 | A1* | 3/2012 | Odenheimer | G06F 9/5072 715/738 |
| 2012/0220263 | A1* | 8/2012 | Smith | H04W 4/003 455/410 |
| 2013/0132468 | A1* | 5/2013 | Azeez | G06F 17/30861 709/203 |
| 2013/0211559 | A1* | 8/2013 | Lawson | G06Q 10/06315 700/83 |

(Continued)

Primary Examiner — Stephen Hong
Assistant Examiner — Marshon Robinson
(74) Attorney, Agent, or Firm — Lowenstein Sandler LLP (57) ABSTRACT

A responsive layout based on behavioral intent in a multi-tenant PaaS system is disclosed. A method of the disclosure includes determining a profile of a user of a PaaS system, an application context for each application associated with the user and hosted by the PaaS system, and a task context of an access to the PaaS system by the user, providing indicators of the determined profile, the determined application context, and the determined task context to a browser application of the user, and providing HyperText Markup Language (HTML) and Cascading Style Sheets (CSS) files of the management console to the browser application, wherein the provided indicators are applied to the HTML and CSS files to generate a responsive layout, wherein the indicators are associated with one or more variants of the HTML and CSS files that provide the responsive layout.

20 Claims, 6 Drawing Sheets (56) References Cited

U.S. PATENT DOCUMENTS

| | | | |
|---|---|---|---|
| 2014/0047413 A1* | 2/2014 | Sheive | H04L 65/403 717/110 |
| 2014/0075385 A1* | 3/2014 | Wan | G06Q 10/1093 715/812 |
| 2014/0164179 A1* | 6/2014 | Geisinger | G06Q 30/02 705/26.41 |
| 2014/0189819 A1* | 7/2014 | Grimaud | G06F 21/36 726/5 |

* cited by examiner

Request access to management console of PaaS product on behalf of a user of the PaaS product
510

Receive HTML/CSS files to render the management console
520

Receive indicators associated with a determined profile of the user and a determined application context and task context of the current access to the PaaS product by the user
530

Determine device/browser capabilities for rendering the HTML/CSS
540

Render a responsive layout of the management console based on a customized variant of the HTML/CSS code as defined by the received indicators and the determined device/browser capabilities
550

RESPONSIVE LAYOUT BASED ON BEHAVIORAL INTENT IN A MULTI-TENANT PLATFORM-AS-A-SERVICE (PAAS) SYSTEM

TECHNICAL FIELD

The embodiments of the disclosure relate generally to platform-as-a-service environments and, more specifically, relate to a responsive layout based on behavioral intent in a multi-tenant PaaS system.

BACKGROUND

Currently, a variety of Platform-as-a-Service (PaaS) offerings exist that include software and/or hardware facilities for facilitating the execution of web applications in a cloud computing environment (the "cloud"). Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings typically facilitate deployment of web applications without the cost and complexity of buying and managing the underlying hardware and software and provisioning hosting capabilities, providing all of the facilities required to support the complete life cycle of building and delivering web application and service entirely available from the Internet. Typically, these facilities operate as one or more virtual machines (VMs) running on top of a hypervisor in a host server.

Users of a PaaS offering may access the PaaS product from a variety of computing devices, such as a desktop computer, a tablet computing device, or a mobile device. However, current PaaS offerings do not customize the user interface to the PaaS product to optimize the user experience with the PaaS product.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide for a responsive layout based on behavioral intent in a multi-tenant Platform-as-a-Service (PaaS) system. In one embodiment, the responsive layout for a multi-tenant PaaS system is provided based on a profile of a user of the PaaS system, context of user's access (e.g., application(s) being accessed, tasks performed, etc.), and a type and functionality of the accessing device. Elements in a management console of the PaaS system may be emphasized based on the above factors. For example, some elements may be re-ordered, some elements may be hidden, some elements may be modified to a different size, and so on.

In one example, users in an administrative role on mobile devices are typically monitoring the application, and since space needs to be conserved, elements are hidden that are not relevant to the interactions using a responsive layout. Emphasis is also given to elements that fit the specific task. Conversely, users in a developer role on mobile devices are also monitoring their application, but may need information that is not relevant to administrators.

In one embodiment, a method of the disclosure includes determining a profile of a user of a PaaS system, an application context for each application associated with the user and hosted by the PaaS system, and a task context of an access to the PaaS system by the user, providing indicators of the determined profile, the determined application context, and the determined task context to a browser application of the user, and providing HyperText Markup Language (HTML) and Cascading Style Sheets (CSS) files of the management console to the browser application, wherein the provided indicators are applied to the HTML and CSS files to generate a responsive layout, wherein the indicators are associated with one or more variants of the HTML and CSS files that provide the responsive layout.

Figure 1:
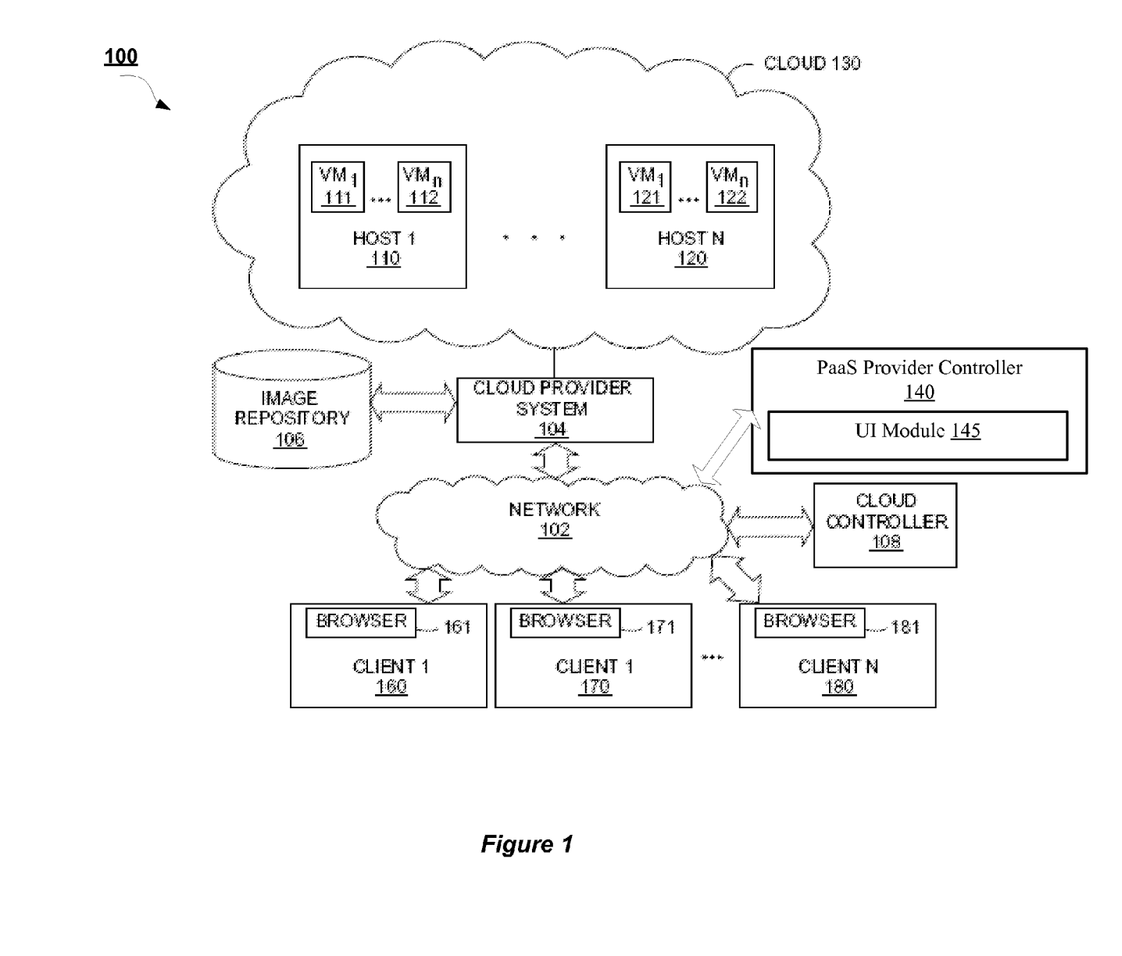
FIG. 1 is a block diagram of a network architecture in which embodiments of the invention may operate.

FIG. 1 is a block diagram of a network architecture 100 in which embodiments of the invention may operate. The network architecture 100 includes a cloud 130 managed by a cloud provider system 104. The cloud provider system 104 provides VMs, such as VMs 111, 112, 121, and 122 hosted in cloud 130. Each VM is hosted on a physical machine, such as host 1 110 through host N 120, configured as part of the cloud 130. In some embodiments, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181.

Clients 160, 170 and 180 are connected to hosts 110, 120 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In some embodiments, cloud controller 108 receives commands from PaaS provider controller 140. Based on these commands, the cloud controller 108 provides data (e.g., such as pre-generated images) associated with different applications to the cloud provider system 104. In some embodiments, the data may be provided to the cloud provider 104 and stored in an image repository 106, in an image repository (not shown) located on each host 110, 120, or in an image repository (not shown) located on each VM 111, 112, 121, 122.

Upon receiving a command identifying specific data (e.g., application data and files used to initialize an application on the cloud), the cloud provider 104 retrieves the corresponding data from the image repository 106, creates an instance of it, and loads it to the host 110, 120 to run on top of a hypervisor (not shown) as a VM 111, 112, 121, 122 or within a VM 111, 112, 121, 122. In addition, a command may identify specific data to be executed on one or more of the VMs 111, 112, 121, 122. The command may be received from the cloud controller 108, from a PaaS Provider Controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based disks, solid-state drives (SSDs) or hard drives.

In one embodiment, PaaS provider controller 140 includes a user interface module 145 configured to enable responsive layouts based on behavioral intent for a UI of a multi-tenant PaaS system implemented in cloud 130. A responsive layout may refer to an organization of page elements that adapt and change based on one or more inputs. The one or more inputs in embodiments of the disclosure are behavioral actions of a user. Behavioral intent may refer to a goal of a user that is inferred based on the user's actions.

The UI module 145 may implement a responsive layout for a management console of the PaaS system, where the responsive layout is based on a profile or persona (e.g., developer, administrator, etc.) of an end user accessing the management console of the PaaS system, an application state of applications associated with the end user (e.g., age of application, number of users, size of application including number of cartridges, etc.), a context of the access by the end user (e.g., errors pending, etc.), and a type of device that the end user is accessing the management console from. Based on information gleaned from all of the above factors, the UI of the management console may be biased to display one or more elements of the default UI that have been determined to be of interest to an end user defined by the above factors. For example, some elements may be hidden entirely, while other elements are moved to the top of the page, and so on.

While various embodiments are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
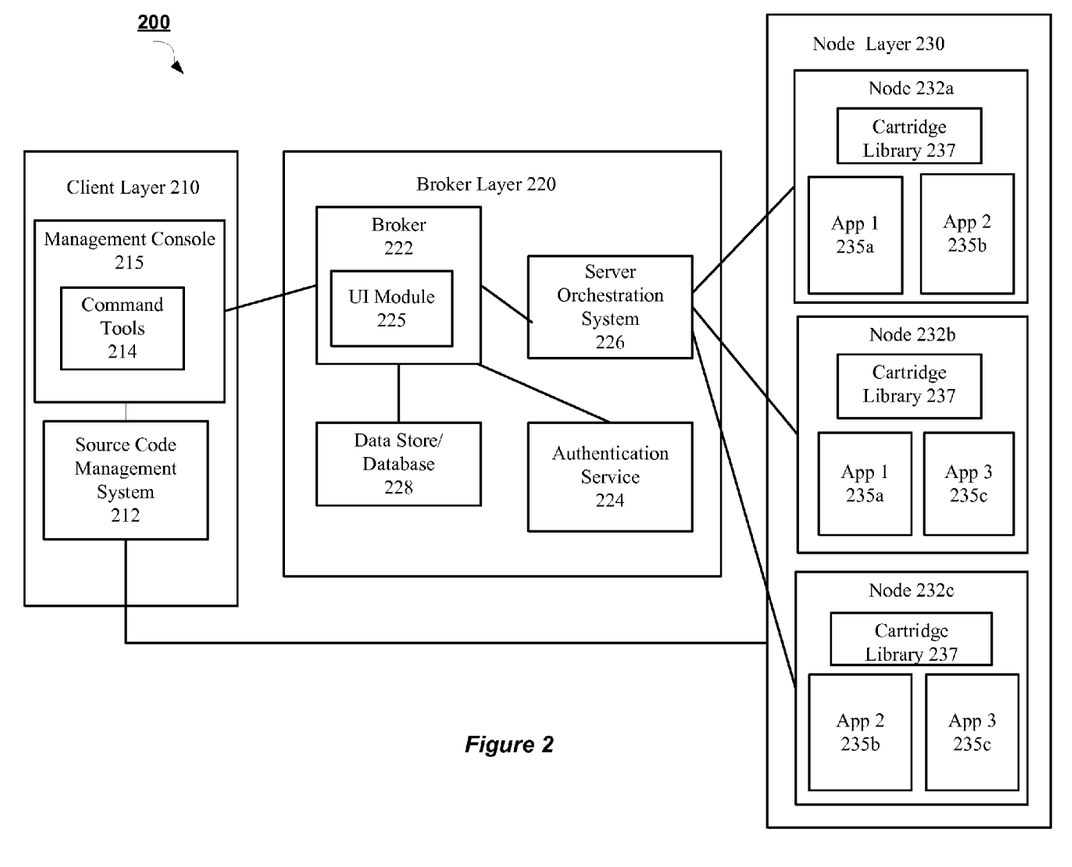
FIG. 2 is a block diagram of a Platform-as-a-Service (PaaS) system architecture according to an embodiment of the disclosure.

FIG. 2 is a block diagram of a PaaS system architecture 200 according to an embodiment of the disclosure. The PaaS architecture 200 allows users to launch software applications in a cloud computing environment, such as cloud computing environment provided in network architecture 100 described with respect to FIG. 1. The PaaS system architecture 200, in one embodiment, includes a client layer 210, a broker layer 220, and a node layer 230.

In one embodiment, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one embodiment, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. From the remote repository, the code may be edited by others with access, or the application may be executed by a machine. Other SCM systems work in a similar manner.

The client layer 210, in one embodiment, also includes a management console 215. The management console 215 may be a graphical user interface accessed with a browser application at a client device hosting the client layer 210. The management console 215 may allow an end user to manage account settings and provide links to documentation and resources of the PaaS system architecture 200.

In one embodiment, a set of command tools 214 is provided via the management console 215. The command tools 214 may be utilized by the end user to create, launch, and manage applications in the PaaS system architecture 200. In one embodiment, the command tools 214 can be downloaded and installed on the user's client machine, and can be accessed via a command line interface or a graphical user interface (e.g., management console 215), or some other type of interface. In one embodiment, the command tools 214 expose an application programming interface ("API") of the broker layer 220 and perform other applications management tasks in an automated fashion using other interfaces, as will be described in more detail further below in accordance with some embodiments.

In one embodiment, the broker layer 220 acts as middleware between the client layer 210 and the node layer 230. The node layer 230 includes the nodes 232*a-c* on which software applications 235*a-c* are provisioned and executed. In one embodiment, each node 232*a-c* is a VM provisioned by an Infrastructure as a Service (IaaS) provider, such as Amazon™ Web Services. In other embodiments, the nodes 232*a-c* may be physical machines or VMs residing on a single physical machine. In one embodiment, the broker layer 220 is implemented on one or more machines, such as server computers, desktop computers, etc. In some embodiments, the broker layer 220 may be implemented on one or more machines separate from machines implementing each of the client layer 210 and the node layer 230, or may implemented together with the client layer 210 and/or the node layer 230 on one or more machines, or some combination of the above.

In one embodiment, the broker layer 220 includes a broker 222 that coordinates requests from the client layer 210 with actions to be performed at the node layer 230. One such request is new application creation. In one embodiment, when a user, using the command tools 214 at client layer 210, requests the creation of a new application 235a-c, or some other action to manage the application 235a-c, the broker 222 first authenticates the user using an authentication service 224. In one embodiment, the authentication service may comprise custom authentication methods, or standard protocols such as SAML, Oauth, etc. Once the user has been authenticated and allowed access to the system by authentication service 224, the broker 222 uses a server orchestration system 226 to collect information and configuration information about the nodes 232a-c.

In one embodiment, the broker 222 uses the Marionette Collective™ ("MCollective™") framework available from Puppet Labs™ as the server orchestration system 226, but other server orchestration systems may also be used. The server orchestration system 226, in one embodiment, functions to coordinate server-client interaction between multiple (sometimes a large number of) servers. In one embodiment, the servers being orchestrated are nodes 232a-c, which are acting as application servers and web servers.

For example, if the broker 222 wanted to shut down all applications 235a-c on all even numbered nodes out of 100,000 nodes, the broker 222 would only need to provide one command to the server orchestration system 226. Then, the server orchestration system 226 would generate and distribute a message to all nodes 232a-c to shut down all applications 235a-c if the node 232a-c is even, using a messaging and queuing system. Thus, in one embodiment, the broker 222 manages the business logic and model representing the nodes 232a-c and the applications 235a-c residing on the nodes, and acts as a controller that generates the actions requested by users via an API of the client tools 214. The server orchestration system 226 then takes the actions generated by the broker 222 and orchestrates their execution on the many nodes 232a-c managed by the system.

In one embodiment, the information collected about the nodes 232a-c can be stored in a data store 228. In one embodiment, the data store 228 can be a locally-hosted database or file store, or it can be a cloud based storage service provided by a Software-as-a-Service (SaaS) provider. The broker 222 uses the information about the nodes 232a-c and their applications 235a-c to model the application hosting service and to maintain records about the nodes. In one embodiment, data of a node 232a-c is stored in the form of a JavaScript Object Notation (JSON) blob or string that maintains key-value pairs to associate a unique identifier, a hostname, a list of applications, and other such attributes with the node.

In embodiments of the invention, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 (VM) that is hosting the first customer's deployed applications 235a-c. In some embodiments, portions of an application are run on multiple different nodes 232a-c. For example, as shown in FIG. 2, components of application 1 235a are run in both node 232a and node 232b. Similarly, application 2 235b is run in node 232a and node 232c, while application 3 235c is run in node 232b and node 232c.

In addition, each node also maintains a cartridge library 237. The cartridge library 237 maintains multiple software components (referred to herein as cartridges) that may be utilized by applications 235a-c deployed on node 232a-c. A cartridge can represent a form of support software providing the functionality needed to run an application 235a-c. In one embodiment, the cartridges support languages such as, but not limited to, JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, cron scheduler, and HAProxy, for example. Adding an instance of a cartridge from cartridge library 237 to an application 235a-c provides a capability for the application 235a-c, without the customer who owns the application having to administer or update the included capability.

In one embodiment, broker 222 includes a UI module 225 to provide a responsive layout for the management console 215 of the PaaS system 200 based on behavioral intent of an end user of the PaaS system. In one embodiment, the UI module 225 is the same as UI module 145 discussed with respect to FIG. 1. The UI module 225 may communicate with other components of broker layer 220 using application programming interfaces (APIs) that allow user input received via UI module 225 to be translated to input for the components of broker layer 220. As discussed above, the UI module 225 may implement a responsive layout for the management console 215 of the PaaS system, where the responsive layout is based on a profile or persona (e.g., developer, administrator, etc.) of an end user accessing the management console 215 of the PaaS system, an application state of applications associated with the end user (e.g., age of application, number of users, size of application including number of cartridges, etc.), a context of the access by the end user (e.g., errors pending, etc.), and a type of device that the end user is accessing the management console from. Based on information gleaned from all of the above factors, the UI of the management console 215 may be rendered with a bias to display one or more elements of the default UI that have been determined to be of interest to an end user defined by the above factors. For example, some elements may be hidden entirely, while other elements are moved to the top of the page, and so on.

In one example, end users in an administrative role on mobile devices are typically monitoring the application, and since space should be conserved, elements that are not relevant to the end user's interaction as an administrator persona may be hidden in the UI using the responsive layout. In another example, end users in a developer role on mobile devices are also monitoring their applications, but may seek information that is not relevant to administrators. As a result, some elements may be reordered or deemphasized, but not hidden.

Figure 3:
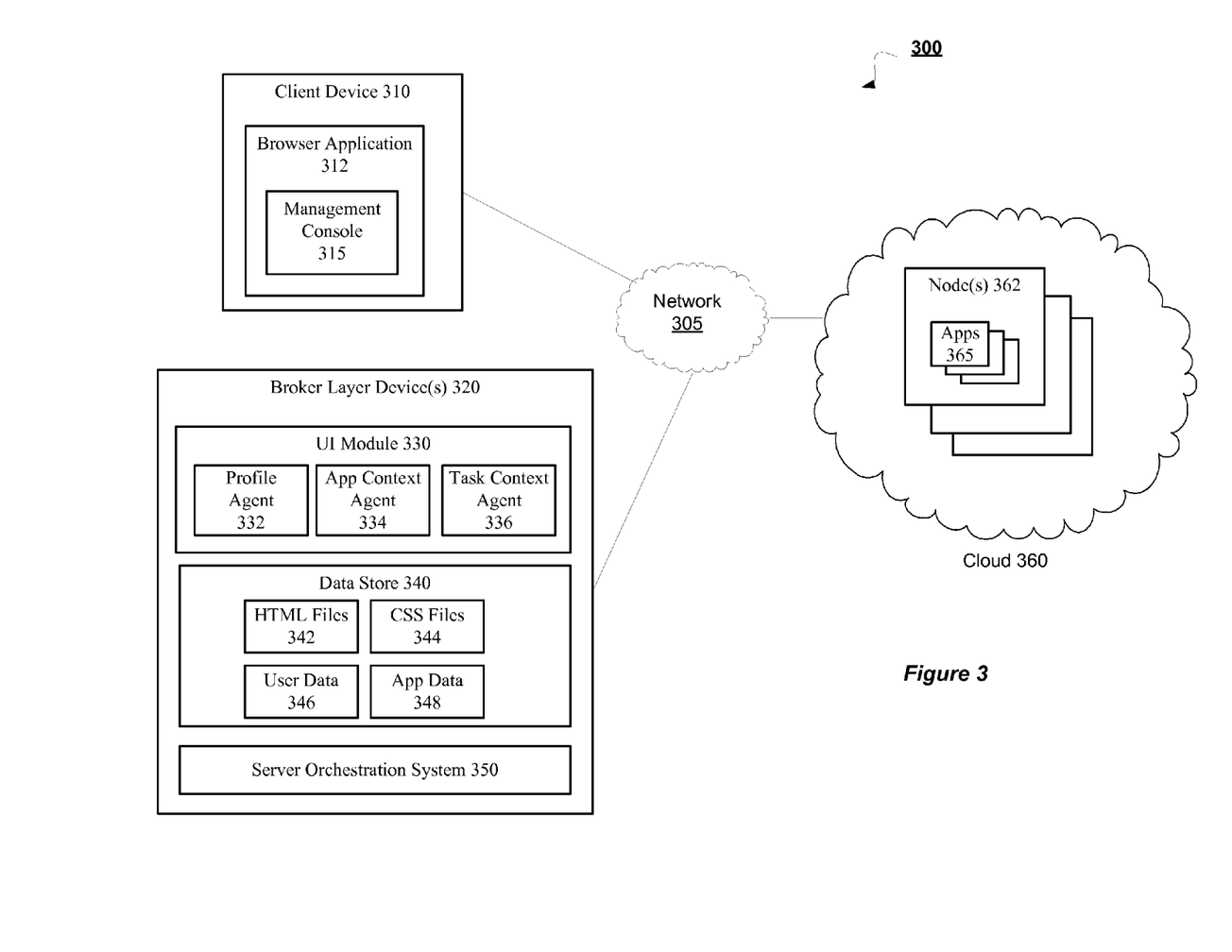
FIG. 3 is a block diagram of a PaaS system implemented using a network architecture to provide a responsive layout for the UI of a management console of the PaaS system according to an embodiment of the disclosure.

FIG. 3 is a block diagram depicting a PaaS system 300 implemented using a network architecture to provide a responsive layout for the UI of a management console of the PaaS system according to an embodiment of the disclosure. As illustrated, PaaS system 300 includes a client device 310 communicably connected to broker layer devices 320 and cloud 360 over a network 305. Network 305 may be a private network (e.g., a local area network (LAN), a wide area network (WAN), intranet, or other similar private networks) or a public network (e.g., the Internet). Client device 310 may be a mobile device, a PDA, a laptop, a desktop computer, a tablet computing device, or any other computing device. Broker layer devices 320 may be server computer systems, desktop computers or any other computing devices. The cloud 360 may include one or more machines such as server computers, desktop computers, etc. In one embodiment, client device 310, broker layer devices 320, and cloud 360 are the same as their counterpart components described with respect to FIGS. 1 and 2.

In one embodiment, an end user of PaaS system 300 may access a management console 315 of PaaS system using a browser application 312 executed on client device 310. Browser application 312 may request the data to render management console 315 from broker layers device(s) 320. Management console 315 provides an interface to an end user to allow the end user to manage account settings and provide links to documentation and resources of the PaaS system architecture 200. Furthermore, management console 315 allows the end user to view and update application settings of applications 365 owned by the end user. In one embodiment, the broker layer devices 320 coordinate the creation and maintenance of applications 365 of the end user. In one embodiment, the broker layer devices 320 utilize a server orchestration system 350 to interact with cloud 360 to implement and maintain applications 365 on nodes 362 of the cloud 360.

In one embodiment, broker layer device 320 includes a UI module 330 to provide the responsive layout for the management console 315. The UI module 330 may be the same as UI modules 145 and 225 described with respect to FIGS. 1 and 2. The UI module 330 may include a profile agent 332, an application context agent 334, and a task context agent 336 to aid in implementation of the responsive layout for management console 315. Agents 332, 334, 336 include logic that assesses a current behavioral state of the end user, which is then used to provide a responsive layout for the management console 315 by browser application 312.

When an end user initializes logs in via a web portal of the PaaS system 300, the broker layer devices 320 may identify the end user based on the log in credentials provided by the end user. In one embodiment, using these login credentials, the profile agent 332 may construct a profile of the end user based on stored data associated with the end user. The stored data may comprise past actions taken by the end user on the PaaS system and previous assessed profiles of the end user. The past actions may include, but are not limited to, creating of an application, copying an application, deploying an application, stopping an application, restarting an application, scaling up an application, changing code of an application, modifying settings of an application, viewing metrics of an application, tracking an application (e.g., viewing recent activity on that application), collecting messages related to an application, viewing errors associated with an application, and so on. In one embodiment, this data is stored in user data 346 of data store 340 of broker layer devices 320.

Based on the past actions, and the number of times such actions have been performed by the user, the profile agent 332 may categorize the end user into a particular profile. In some embodiments, there may be a variety of profiles an end user may be categorized into. For a PaaS system, such as PaaS system 300, two example profiles are an administrator profile and a developer profile. For example, an end user that is consistently performing actions such as creating applications and changing code of applications, then the profile agent 332 may categorize the end user in a developer profile. On the other hand, if the end user is consistently performing actions such as deploying applications and looking at metrics of applications (e.g., graphs or other representative displays of relevant application statistics, such as incoming web requests a second, processing power usage over time, memory usage over time, hard disk usage over time, number of errors recorded by the system, etc.), then the end user may be categorized in an administrator profile. In some embodiments, an end user may often perform aspects of both roles, and can switch between profiles in the same session based on the tasks they are performing. Moreover, in some embodiments, there may be a profile that is a mixture between an administrator and a developer, such as an overseer.

In embodiments of the disclosure, the profile agent 332 is programmed with a function that takes the various end user actions, as well as previous assessed profiles, as inputs, and outputs an indicator of a profile that the end user is categorized into. In some embodiments, machine learning techniques may be implemented to generate and continuously update the profiling function.

Similarly, concurrent with the profile assessment, the application context agent 334 may assemble an application context of all applications associated with the user. In one embodiment, the application context of an application may include an age of an application, such as where an application is in the arc of the development cycle. For example, a younger application may be recently created, not scaled, and/or have low usage and traffic numbers. A mature application may have an established duration, scaled up, and/or high usage and traffic numbers. In embodiments of the disclosure, the application context agent 334 may access previous application data 348 in data store 340 or may interact with applications 365 directly, to obtain the past application activity. This past application activity may act as inputs into a function of the application context agent 334 that generates an indicator to define the age of the application context.

Furthermore, concurrent with the profile and application context assessments, the task context agent 336 may determine a task context of the end user's access to the management console 315. The task context may refer to a current state of the applications associated with the end user, such as whether each of the applications are in a nominal (e.g., smooth, error-free, green) state or an error (e.g., rough, red) state. In embodiments of the disclosure, the task context agent 334 may access previous application data 348 in data store 340 or may interact with applications 365 directly, to obtain the application states information and determine whether applications are in a nominal or error state. These application states may act as inputs into a function of the task context agent 334 that generates an indicator to define the state of an end user's application in the current end user session with the management console 315.

If the end user focuses on a specific application 365 using the management console, then the UI module 330 may update the indicators generated by agents 332, 334, 336 using specific information from the application 365. For example, an end user's actions related to one application may differ with respect to another application based on whether an error is being generated by an application, the age of the application, and so on. The application 365 may be in a better position to provide such data to the agents 332, 334, 336, and the agents 332, 334, 336 may re-assess their indicators accordingly. In other embodiments, the UI module 330 may periodically re-assess the indications generated by the agents 332, 334, 336 based on the expiration of a predetermined time interval set by an administrator of the PaaS system or by the end user.

In embodiments of the disclosure, the UI module 330 provides the indicators generated by agents 332, 334, 336, along with HyperText Markup Language (HTML) file(s) 342 and Cascading Style Sheets (CSS) file(s) 344, to the web browser 312 in order for the web browser 312 to render the management console 315 in a responsive layout. In one embodiment, the web browser applies the indicators to the received CSS and HTML files in order to apply selective styling to the elements in the CSS and HTML files so that the rendered management console 315 is biased towards the profiles and contexts determined by the agents 332, 334, 336. Furthermore, the web browser 312 may also determine an indicator of the device type and resolution to additionally apply to the CSS and HTML files to bias the rendered management console 315.

In one embodiment, biasing refers to emphasizing elements of the management console 315 so that those elements determined as significant to the determined profile, application context, task context, and device/resolution context are visually enhanced to the user. For example, an element may be shown or not shown, given priority placement on the page, modified in terms of size, color, border, and background, or otherwise altered in terms of presentation (e.g., animated). The HTML and CSS files may include specific rules/variations for each element based on the type of indicator. In one embodiment, the indicator may be a CSS class marker, for example. As a result, in embodiments of the disclosure, the browser application 312 can apply the indicators to the CSS and HTML files in order to render the management console 315 in a responsive layout for the current behavior of the end user (as assessed by the UI module 330).

The following are examples of different applications of a responsive layout based on behavioral intent in a PaaS system. In one example, recorded errors in the application may be relevant to all types of end users. Because an end user in an administrator role is assumed to be responsible for rapidly reacting to those errors, the section of recorded errors is indicated as particularly relevant for administrators in the CSS/HTML files. On a mobile device, for an administrator, the error list may dominate the visible screen real estate and lead to the user minimizing it before continuing. On the other hand, a developer using a mobile device may see the errors near the top of the scrollable content. End users on a desktop may see the errors visually distinguished in the page, but part of the regular structure of the page.

In a second example, the application state (e.g., running, stopped) is also relevant to all types of end users. However, application state may be considered more relevant when using a mobile device because the end user is assumed to be performing maintenance operations. On a mobile device the section of the interface for application status may be increased in size and occupy a prominent position next to the name of the application. On a desktop the application status may be integrated into more detailed sections of the page with less focus.

In a third example, application development functions may not be considered as relevant to administrators. On a mobile device they may be considered even less relevant, because mobile devices generally lack the other supporting tools to develop code. Developers using a mobile device may see the section of the interface related to making code changes deemphasized. On the other hand, administrators using a mobile device may not see that section at all.

In a fourth example, application metrics are useful for developers, but critical for administrators to anticipate problems. End users on a mobile device may see a more compact presentation of metrics data. Ends user in an administrator role on a mobile device may have certain types of metrics made more visually prominent (e.g., those related to application health). In comparison, end users in a developer role on a mobile device may see equal weight given to all types of metrics.

In a fifth and final example, when problems occur, they often occur as a result of an action on the application. As a result, the PaaS system may display a list of the recent activity on that application. Administrators diagnosing the condition of the application should see that information correlated with any errors that the application may be experiencing. Correspondingly, if a developer added code and the application began experiencing an error, then that problem state is similarly relevant to the developer. As a result, on a mobile device, the recent activity list may be prominently displayed immediately after the list of errors to an administrator. However, a developer may see the list further down in the screen (requiring scrolling).

Figure 4:
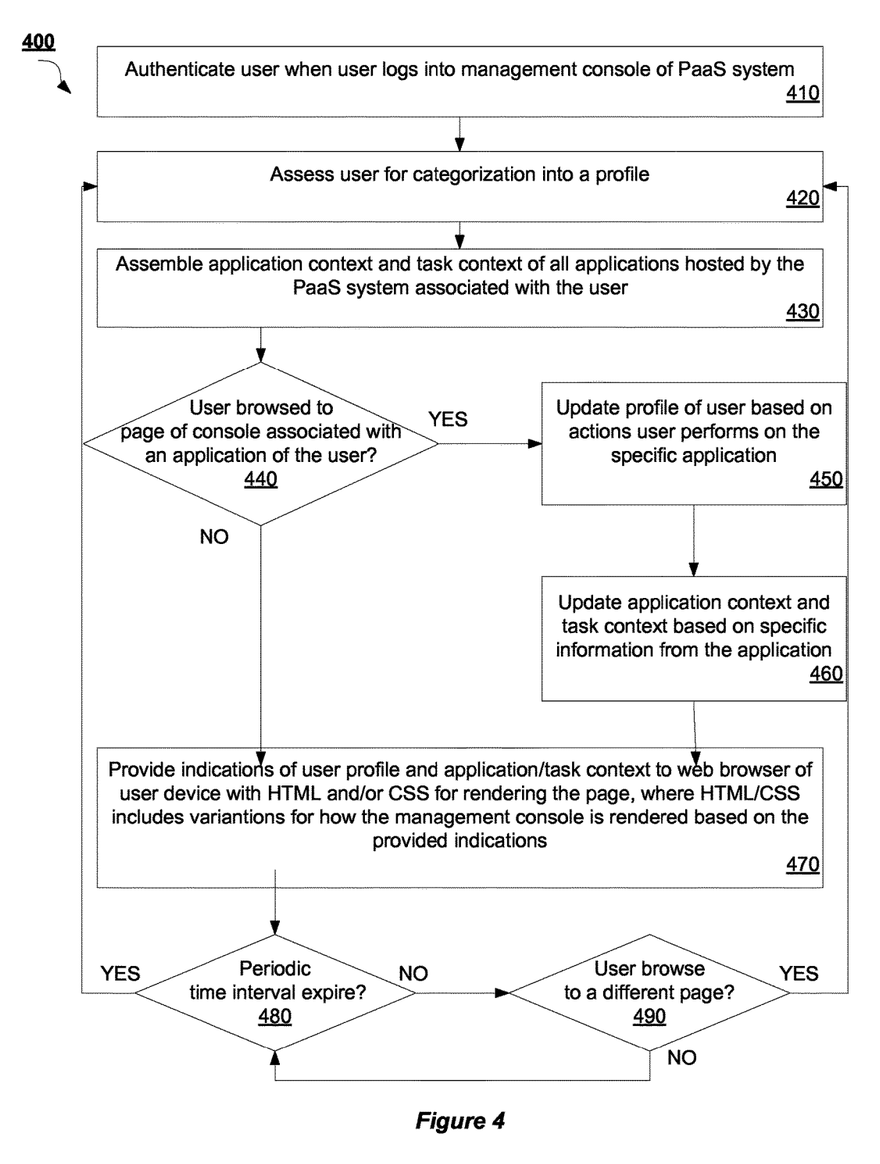
FIG. 4 is a flow diagram illustrating a method for responsive layout based on behavioral intent in a multi-tenant PaaS system according to an embodiment of the disclosure.

FIG. 4 is a flow diagram illustrating a method 400 for responsive layout based on behavioral intent in a multi-tenant PaaS system according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by a UI module executing on a computing device, such as UI module 225 or 330 described with respect to FIGS. 2 and 3.

Method 400 begins at block 410 where a user is authenticated upon logging into a management console of a PaaS system. Then, at block 420, the user is assessed for purposes of categorization into a profile with respect to the PaaS system. In one embodiment, the profile of the user is constructed based on past activity of the user in terms of interactions with the PaaS system. In some embodiments, previous profile assessments are also taken into consideration in constructing a current profile for the user. A profile may include, for example, an administrator, a developer, or some persona that falls in between the administrator and the developer.

At block 430, an application context and task context of each of the applications associated with the user and hosted by the PaaS system is assembled. In one embodiment, the application context may include an age of the application in terms of the development cycle for an application. The task context may include whether an application is running in a nominal state or an error state.

Then, at decision block 440, it is determined whether the user browsed to a page of the management console that is associated with a specification application of the end user. If so, method 400 proceeds to block 450, where the profile of the user is updated based on the specific actions the user performs on the application. In some embodiments, the application provides this user information to the UI module in order for the UI module to update its profile assessment of the end user. Then, at block 460, the application context and the task context are updated based on specific information from the application. For example, the particular age and state of the application can be updated to correspond to the specific application being accessed by the end user. Method 400 then proceeds to block 470 described below.

If the user has not browsed to a page of the management console associated with a specific application at decision block 440, then method 400 proceeds directly to block 470 where indications of the constructed user profile and the application and task contexts are provided to a web browser of the user device that renders the management console. Furthermore, HTML and/or CSS files for the management console are also provided with the indications. In one embodiment, the HTML and/or CSS files include variations for how the management console is rendered based on the provided indications. In one example, the indications may be CSS class markers.

At decision block 480, it is determined whether a periodic time interval has expired. In one embodiment, the time interval may be configured by an administrator of the PaaS system. In other embodiments, the time interval is configured by the end user accessing the management console. If the periodic time interval has not expired, the method 400 proceeds to decision block 490 to determine if the user has browsed to a different page of the management console. If so, method 400 returns to block 420 to repeat. If not, then method 400 returns to decision block 480 to continue to determine if the periodic time interval has expired. If the periodic time interval has expired at decision block 480, then method 400 returns to block 420 to repeat.

Figure 5:
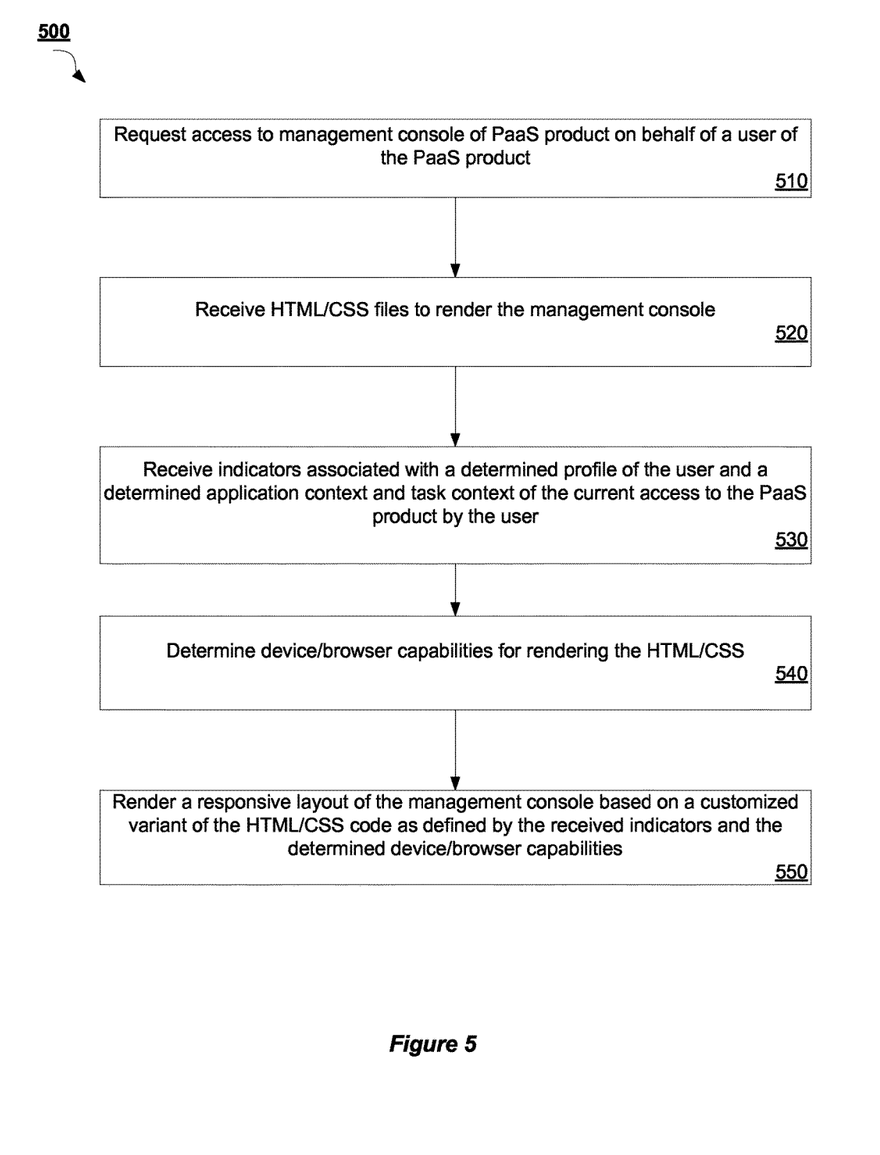
FIG. 5 is a flow diagram illustrating a method for rendering a responsive layout based on behavioral intent in a multi-tenant PaaS system according to an embodiment of the disclosure.

FIG. 5 is a flow diagram illustrating a method 500 for rendering a responsive layout based on behavioral intent in a multi-tenant PaaS system according to an embodiment of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by a web browser on a computing device, such as web browser 312 of client device 310 described with respect to FIG. 3.

Method 500 begins at block 510 where access to a management console of a PaaS product is requested on behalf of an end user of the PaaS system. Then, at block 520, HTML and/or CSS files are received for rendering the management console. Furthermore, at block 530, indicators are received associated with a determined profile of the user and a determined application context and task context of the current access to the PaaS product by the user.

In one embodiment, a UI module of the PaaS product generates the indicator for the profile based on past activity of the user in terms of interactions with the PaaS system. In some embodiments, previous profile assessments are also taken into consideration in constructing a current profile for the user. A profile may include an administrator, a developer, or some persona that falls in between the administrator and the developer. The UI module of the PaaS product may also generate the indicator for the application context based on an age of the application in terms of the development cycle for an application. The UI module may additionally generate the task context based on whether an application is running in a nominal state or an error state.

Subsequently, at block 540, device and browser capabilities for rendering the received HTML/CSS are determined. For example, the type of device and resolution of the display of the device may affect the capabilities of the device display and browser rendering functions. At block 550, a responsive layout of the management console is rendered based on a customized variant of the HTML/CSS code defined by the provided indicators and the determined device/browser capabilities.

Figure 6:
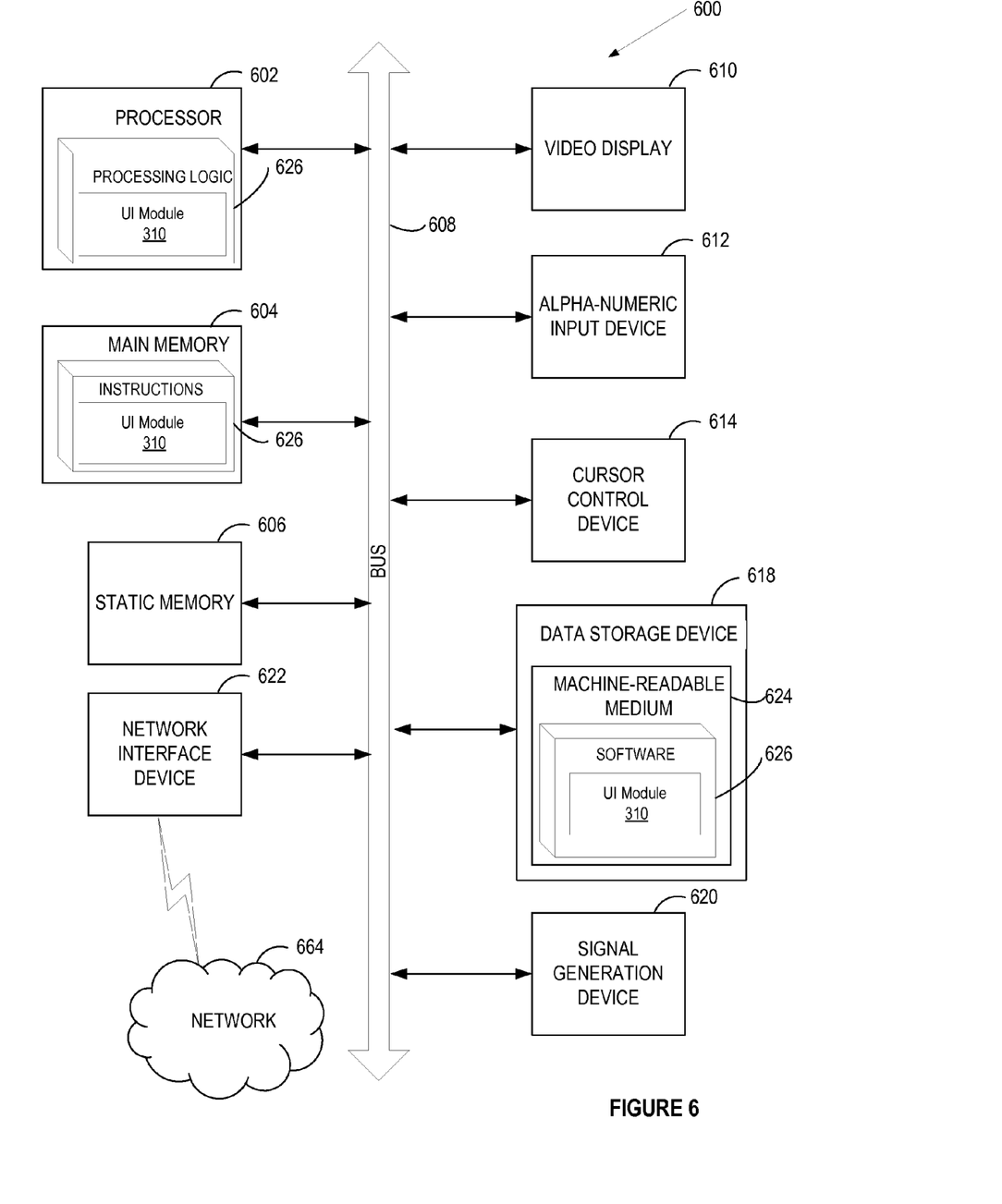
FIG. 6 illustrates a block diagram of one embodiment of a computer system.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement a UI module 330 to implement a responsive layout based on behavioral intent in a multi-tenant PaaS system, such as the UI module 330 of broker layer devices 320 described with respect to FIG. 3, and/or a software library containing methods that call the above applications. While the machine-accessible storage medium 628 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "identifying", "providing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A computer-implemented method, comprising:

identifying, by a processing device of a Platform-as-a-Service (PaaS) system, a user of the PaaS system via login credentials provided by the user when the user accesses a management console of the PaaS system, wherein the PaaS system provides for the creation and deployment of applications on one or more nodes of the PaaS system, wherein two or more of the applications are deployed on a same node of the one or more nodes of the PaaS system;

determining, by the processing device, a profile of the user comprising a role of the user on the PaaS system, an application context for each application associated with the user and hosted by the PaaS system, and a task context of an access to the PaaS system by the user, wherein the application context is in view of an application development cycle of the application, and wherein the task context is in view of a state of the application;

providing indicators of the determined profile, the determined application context, and the determined task context to a browser application of the user; and providing, by the processing device, HyperText Markup Language (HTML) and Cascading Style Sheets (CSS) files of the management console to the browser application, wherein the provided indicators are applied to the HTML and CSS files to generate a responsive layout;

wherein the indicators are associated with one or more variants of the HTML and CSS files that provide the responsive layout.

2. The method of claim 1, wherein the role of the user comprises at least one of a developer or an administrator.

3. The method of claim 2, wherein the determining the profile is in view of one or more previous actions that the user performed on the PaaS system.

4. The method of claim 1, wherein the application context comprises an age of the application in terms of the application development cycle.

5. The method of claim 1, wherein the state of the application comprises at least one of a nominal state or an error state.

6. The method of claim 1, wherein the responsive layout is further in view of at least one of device display characteristics of a device executing the browser application or capabilities of the browser application.

7. The method of claim 1, further comprising:
determining that the user is accessing a page of the management console associated with one of the applications associated with the user;
updating the determined profile of the user in view of one or more previous actions that user performed on the one of the applications;
updating the determined application context in view of an age of the one of the applications;
updating the determined task context in view of a state of the one of the applications; and
providing updated indications, along with the HTML and CSS files, to the browser application in view of the updated profile, the updated application context, and the updated task context, the indications provided with the HTML and CSS files.

8. The method of claim 1, further comprising:
determining that a time interval has expired;
responsive to the time interval expiring, updating the determined profile of the user, the determined application context, and the determined task context; and
providing updated indications to the browser application in view of the updated profile, the updated application context, and the updated task context;
wherein the browser application renders the management console in the responsive layout in view of an application of the updated indicators to the HTML and CSS files, the updated indicators associated with one or more variants of the HTML and CSS files that provide the responsive layout.

9. A system, comprising:
a data store to maintain HyperText Markup Language (HTML) and Cascading Style Sheets (CSS) files for a management console of a Platform-as-a-Service (PaaS) system, wherein the PaaS system provides for the creation and deployment of applications on one or more nodes of the PaaS system, wherein two or more of the applications are deployed on a same node of the one or more nodes of the PaaS system; and
a processing device communicably coupled to the data store and the memory, the processing device to:
determine a profile of the user, an application context for each application associated with the user and hosted by the PaaS system, and a task context of an access to the PaaS system by the user;
determine a profile of the user comprising a role of the user on the PaaS system, an application context for each application associated with the user and hosted by the PaaS system, and a task context of an access to the PaaS system by the user, wherein the application context is in view of an application development cycle of the application, and wherein the task context is in view of a state of the application;
provide indicators of the determined profile, the determined application context, and the determined task context to a browser application of the user; and
provide the HTML and CSS files of the management console to the browser application;
wherein the browser application renders the management console in a responsive layout in view of an application of the provided indicators to the HTML and CSS files, the indicators associated with one or more variants of the HTML and CSS files that provide the responsive layout.

10. The system of claim 9, wherein the role of the user comprises at least one of a developer or an administrator, and wherein the determining the profile is in view of one or more previous actions that the user performed on the PaaS system.

11. The system of claim 9, wherein the application context comprises an age of the application in terms of the application development cycle.

12. The system of claim 9, wherein the state comprising at least one of a nominal state or an error state.

13. The system of claim 9, wherein the responsive layout is further in view of at least one of device display characteristics of a device executing the browser application or capabilities of the browser application.

14. The system of claim 9, wherein the processing device is further to:
determine that the user is accessing a page of the management console associated with one of the applications associated with the user;
update the determined profile of the user in view of one or more previous actions that user performed on the one of the applications;
update the determined application context in view of an age of the one of the applications;
update the determined task context in view of a state of the one of the applications; and
provide updated indications, along with the HTML and CSS files, to the browser application in view of the updated profile, the updated application context, and the updated task context, the indications provided with the HTML and CSS files.

15. The system of claim 9, wherein the processing device is further to:
determine that a time interval has expired;
responsive to the time interval expiring, update the determined profile of the user, the determined application context, and the determined task context; and
provide updated indications to the browser application in view of the updated profile, the updated application context, and the updated task context;
wherein the browser application renders the management console in the responsive layout in view of an application of the updated indicators to the HTML and CSS files, the updated indicators associated with one or more variants of the HTML and CSS files that provide the responsive layout.

16. A non-transitory machine-readable storage medium including data that, when accessed by a processing device, cause the processing device to:
identify, by the processing device of a Platform-as-a-Service (PaaS) system, a user of the PaaS system via login credentials provided by the user when the user accesses a management console of the PaaS system, wherein the PaaS system provides for the creation and deployment of applications on one or more nodes of the PaaS system, wherein two or more of the applications are deployed on a same node of the one or more nodes of the PaaS system;

determine, by the processing device, a profile of the user comprising a role of the user on the PaaS system, an application context for each application associated with the user and hosted by the PaaS system, and a task context of an access to the PaaS system by the user, wherein the application context is in view of an application development cycle of the application, and wherein the task context is in view of a state of the application;

provide indicators of the determined profile, the determined application context, and the determined task context to a browser application of the user; and provide, by the processing device, HyperText Markup Language (HTML) and Cascading Style Sheets (CSS) files of the management console to the browser application, wherein the provided indicators are applied to the HTML and CSS files to generate a responsive layout;

wherein the indicators are associated with one or more variants of the HTML and CSS files that provide the responsive layout.

17. The non-transitory machine-readable storage medium of claim 16, wherein the processing device to determine the profile is in view of one or more previous actions that the user performed on the PaaS system.

18. The non-transitory machine-readable storage medium of claim 16, wherein the responsive layout is further in view of at least one of device display characteristics of a device executing the browser application or capabilities of the browser application.

19. The non-transitory machine-readable storage medium of claim 16, wherein the processing device is further to:

determine that the user is accessing a page of the management console associated with one of the applications associated with the user;

update the determined profile of the user in view of one or more previous actions that user performed on the one of the applications;

update the determined application context in view of an age of the one of the applications;

update the determined task context in view of a state of the one of the applications; and provide updated indications, along with the HTML and CSS files, to the browser application in view of the updated profile, the updated application context, and the updated task context, the indications provided with the HTML and CSS files.

20. The non-transitory machine-readable storage medium of claim 16, wherein the processing device is further to:

determine that a time interval has expired;

responsive to the time interval expiring, updating the determined profile of the user, the determined application context, and the determined task context; and providing updated indications to the browser application in view of the updated profile, the updated application context, and the updated task context;

wherein the browser application renders the management console in the responsive layout in view of an application of the updated indicators to the HTML and CSS files, the updated indicators associated with one or more variants of the HTML and CSS files that provide the responsive layout.

\* \* \* \* \*